March 10, 1959 W. A. JENNINGS 2,876,813
STRUCTURAL BEAM HOLDING CLAMP UNIT
Filed May 26, 1955
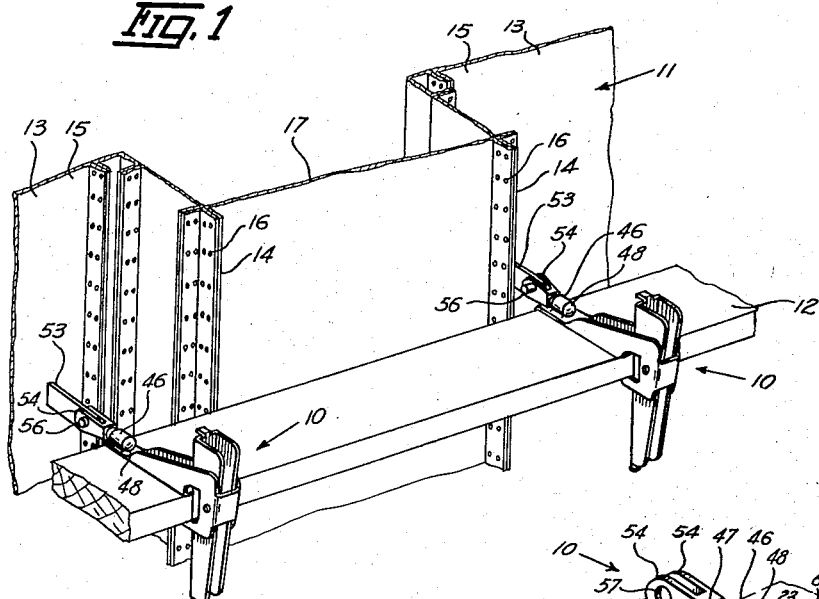
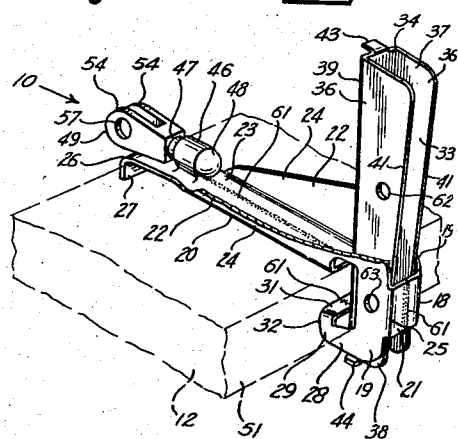
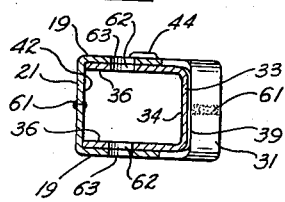
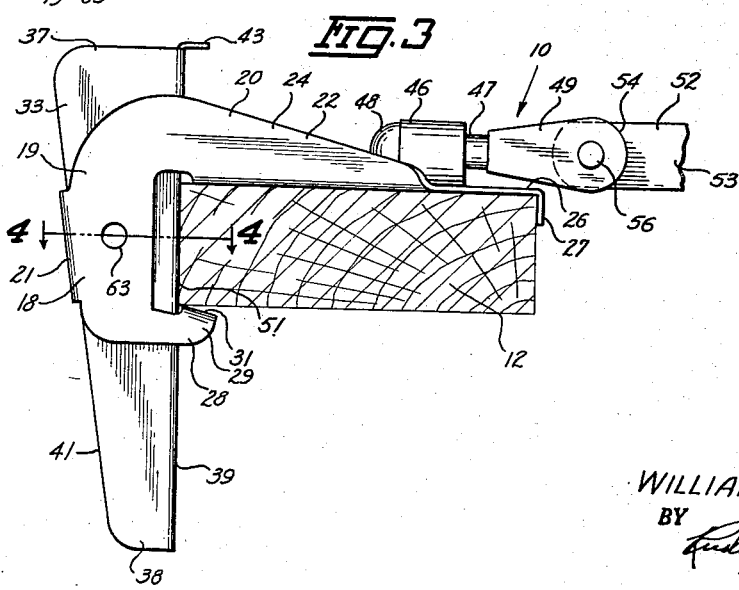
INVENTOR.
WILLIAM A. JENNINGS
BY
ATTORNEY.

United States Patent Office 2,876,813
Patented Mar. 10, 1959

2,876,813

STRUCTURAL BEAM HOLDING CLAMP UNIT

William A. Jennings, Des Moines, Iowa, assignor to Economy Forms Corporation, Des Moines, Iowa, a corporation of Iowa Application May 26, 1955, Serial No. 511,353

1 Claim. (Cl. 144—291)

This invention relates generally to concrete form structures for forming pilasters and more particularly to a clamp unit or device for mounting structural beams on a pilaster form for the purpose of supporting the form.

An object of this invention, therefore, is to provide an improved clamp unit for connecting a pilaster form with a supporting structural beam.

A further object of this invention is to provide a clamp unit which is supported on a structural beam and which includes a member connectible to a tie rod or the like for holding the beam and clamp in a supported relation with a form structure.

Another object of this invention is to provide a clamp unit of the above described type which may be easily and quickly applied to a supporting beam and which is positive in its locking action.

Still a further object of this invention is to provide a clamp unit which is simple in construction, economical to manufacture from a stamping material, and of a construction to accommodate dimensional variations in structural beams.

Further objects, features and advantages of this invention will become apparent from a consideration of the following description when taken in connection with the accompanying drawing in which:

Fig. 1 is a fragmentary perspective view of a concrete form structure and a structural supporting beam therefor, showing a pair of clamp units of this invention in assembly relation therewith;

Fig. 2 is an enlarged perspective view of a clamp unit of this invention, shown in assembly relation with a fragmentary portion of a supporting beam, and showing the wedge member for the unit in a retracted position; with portions of the clamp unit being broken away for the purpose of clarity;

Fig. 3 is an enlarged side elevational view of the clamp unit of this invention, shown in assembly relation with a structural beam and a tie rod, only a portion of which is illustrated, and showing the wedge member for the unit in an advanced or clamping position; and Fig. 4 is a transverse sectional view of the clamp unit of this invention looking along the line 4—4 in Fig. 3.

With reference to the drawing, a pair of clamp units of this invention, indicated generally at 10, are shown in Fig. 1 in assembly relation with a concrete form structure 11 and a structural supporting beam 12, illustrated as being of 2 x 6 type. The form structure 11 is constructed of form members 13 provided with upright peripheral walls or rims 14 formed with rows of transversely spaced openings 16. The forms 13 are held together in the usual manner by the provision of locking devices (not shown) which cooperate with the openings 16 to connect adjacent rims 14 when the forms 13 are arranged in tiers in a side by side relation. As shown in Fig. 1, a transversely central portion 17 of the form structure 11 is outwardly offset relative to the end portions 15 thereof for the purpose of forming a pilaster within the form structure portion 17.

A clamp unit 10 includes an integral substantially J-shape body member 20 (Figs. 2 and 3) having an upright base section 18 formed of a pair of parallel spaced plate portions 19 connected at their outer sides 25 by a vertically inclined strap 21. The body member 20 further includes an upper leg section 22 formed with a horizontal portion 23 (Fig. 2) having a pair of spaced upwardly directed side plate portions 24 which are continuous with the base plate portions 19. The horizontal portion 23 terminates at its free end 26 in a down turned stop member 27.

A leg section 28 (Figs. 2 and 3) arranged below the upper leg section 22 is of a substantially shorter length than the leg section 22, and includes a pair of spaced parallel side plates 29 which are continuations of the base plates 19. A strap 31, substantially parallel with the horizontal portion 23 of the longer leg section 22, connects the free ends of the side plates 29.

Movably supported on the base section 18 at a position between the side plates 19 and between the connecting straps 21 and 31 is a tapered wedge member 33 which is of a substantially U-shape (Figs. 3 and 4) in transverse section, having a base portion 34 and a pair of parallel leg sections 36. The wedge member 33 has a large upper end 37, a smaller lower end 38 (Fig. 3) and a straight substantially vertical front side 39 formed by the base portion 34. The free sides 41 of the leg portions 36 constitute the rear side of the wedge 33 and are uniformly inclined between the ends 37 and 38 of the wedge 33.

As best appears in Figs. 3 and 4, the inclination of the sides 41 of the leg portions 36 corresponds to the inclination of the strap 21 for the base portion 18 of the body member 20. Further, the free sides 41 of the legs 36 are positioned in guided engagement with the inner surface 42 of the inclined strap 21. As a result, on downward movement of the wedge member 33, from the withdrawn position shown in Fig. 2 toward the advanced or clamping position shown in Fig. 3, the front side 39 of the wedge 33 is moved longitudinally of the leg sections 22 and 28 in a direction toward the stop member 27. A laterally extended stop 43 at the upper end, and a transversely extended stop 44 at the lower end, of the wedge member 33 positively prevent any accidental movement of the wedge member 33 out of a supported position on the body member 20.

Rotatably mounted within a tubular bearing 46 secured to the horizontal portion 23 of the leg section 22 at a position spaced from the free end 26 thereof, is a pin 47 (Fig. 3). A head 48 on one end of the pin 47 and a bifurcated connecting member 49 on the opposite end thereof maintain the pin 47 within the bearing 46.

In the use of a clamp unit 10, the bifurcated connecting member 49 is moved to a position in which the end portion 52 of a tie rod 53 is received between the bifurcations 54. A pin 56 extended through openings 57 in the bifurcations 54 and the tie rod 53 connects the connecting member 49 and the tie rod 53.

In Figs. 1 and 3, the tie rod 53 is shown disposed in a vertical plane. However, in some instances a tie rod to which the unit 10 is to be connected is in a horizontal plane and at other times a tie rod may be in an inclined plane. In such cases, the connecting member 49 is manipulated to rotate the supporting pin 47 in the bearing 46 until the bifurcations 54 are parallel with and on opposite sides of the tie rod, after which the pin 56 is used to connect the member 49 and the tie rod. In the event the tie rod does not proejct a sufficient distance outwardly of the form structure 11 to permit a direct connection thereof with the connecting member 49, a link (not shown) similar to but shorter than a tie rod 53 is extended between the tie rod 53 and the connecting member 49.

The beam 12 is positioned between the stop 27 and the wedge 33 with the wedge 33 in a retracted position spaced from the beam 12. On downward movement of the wedge 33 (Fig. 3), the front side 39 of the wedge 33 engages the adjacent side 51 of the beam 12 to thereby positively clamp the beam between the wedge 33 and the stop 27. Aligned openings 62 and 63 in the wedge 33 and the body member base section 18, respectively, are adapted to reecive a pin (not shown) to prevent any movement of the wedge 33 out of a clamping position.

From the above description, it is seen that this invention provides a clamp unit 10 which is readily assembled with a form structure 11 and a structural beam 12 in the forming of a pilaster. By virtue of the connection of the unit 10 with the tie rods 53 carried in the form structure portions 15 on opposite sides of the pilaster portion 17, no tie rods are extended through the formed pilaster. Further, a clamp unit 10 is readily formed in identical half portions from a stamping material. These half portions are then bent to the illustrated shapes and held together by welding, indicated at 61, along the horizontal leg portion 23, the guide strap 21 and the connecting strap 31.

Although the invention has been described with respect to a preferred embodiment thereof, it is to be understood that it is not to be so limited, since changes can be made therein which are within the full intended scope of this invention as defined by the appended claim.

I claim:

A clamp unit for holding a structural beam against a laterally offset pilaster form portion of a concrete form structure, said structure including further outwardly projected tie rods at opposite sides of said form portion, said clamp unit comprising a body member of a substantially J shape extended transversely of said beam, said body member including a first section adapted to extend over one side of said beam, a second section adapted to extend partially over the opposite side of said beam, and a third section having spaced parallel side portions intergal with said first and second sections and having a connecting portion between the side edges thereof remote from said beam, a member rotatably mounted on said first section and including a bifurcated end adapted for connection to a tie rod, and a wedge member guidably supported within said third section for transverse movement relative to said first and second sections and normal to the longitudinal axis of said beam, whereby said wedge member is adapted to move said beam into engagement with said form portion.

References Cited in the file of this patent

UNITED STATES PATENTS

| | | |
|---|---|---|
| 1,195,889 | Willeford | Aug. 22, 1916 |
| 1,303,345 | McFeaters | May 13, 1919 |
| 1,332,442 | Kane | Mar. 2, 1920 |
| 1,535,779 | Johnston | Apr. 28, 1925 |
| 1,619,144 | McMillan | Mar. 1, 1927 |
| 2,187,642 | Brown | Jan. 16, 1940 |